(12) United States Patent
Siedler et al.

(10) Patent No.: US 6,454,640 B1
(45) Date of Patent: Sep. 24, 2002

(54) PORTABLE GRINDER WITH DOUBLE SEAL BEARING

(75) Inventors: Albrecht Siedler, Stuttgart; Klaus Wurst, Leinfelden-Echterdingen; Beat Jordi, Obergerlafingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/787,161
(22) PCT Filed: Aug. 18, 2000
(86) PCT No.: PCT/DE00/02819
§ 371 (c)(1),
(2), (4) Date: Mar. 14, 2001
(87) PCT Pub. No.: WO01/15857
PCT Pub. Date: Mar. 8, 2001

(30) Foreign Application Priority Data

Sep. 1, 1999 (DE) .......................................... 199 41 620

(51) Int. Cl.$^7$ ............................................... B24B 23/04
(52) U.S. Cl. ...................................... 451/357; 451/456
(58) Field of Search ................................ 451/357, 359, 451/360, 353, 344, 456

(56) References Cited

U.S. PATENT DOCUMENTS 5,560,715 A   10/1996   Mosby
5,816,711 A   10/1998   Gingrich

FOREIGN PATENT DOCUMENTS

| DE | 195 30 542 A | 2/1997 |
| DE | 198 00 046 A | 9/1998 |
| EP | 0 404 133 A | 12/1990 |
| EP | 0 752 679 A | 1/1997 |
| EP | 0 842 736 A | 5/1998 |
| EP | 0 894 990 A | 2/1999 |

OTHER PUBLICATIONS

Patent Abstracts of Japan vol. 1996, No. 11, Nov. 29, 1996 & JP 08 182242 A, Jul. 12, 1996.

*Primary Examiner*—Robert A. Rose
(74) *Attorney, Agent, or Firm*—Michael J. Striker

(57) ABSTRACT

The invention is based on a power tool (10), in particular a power sander (101, 102, 103) with a housing (12, 112, 212) and a motor (20, 120, 220), supported in the housing, that has a rotatable drive shaft (22, 122, 222) which is connected operatively by one end to a tool (50, 150), and in particular carries a sanding plate that can be equipped with grinding means (52), relative to which sanding plate the drive shaft (22, 122, 222) is rotatably supported by means of a bearing (25, 125, 425), in particular by means of a roller bearing with an inner race (28) and outer race (30) spaced apart by a bearing gap (26) and with rotationally fixed and rotatably disposed parts, and in particular is provided with means for removing grinding dust.

Figure 1:
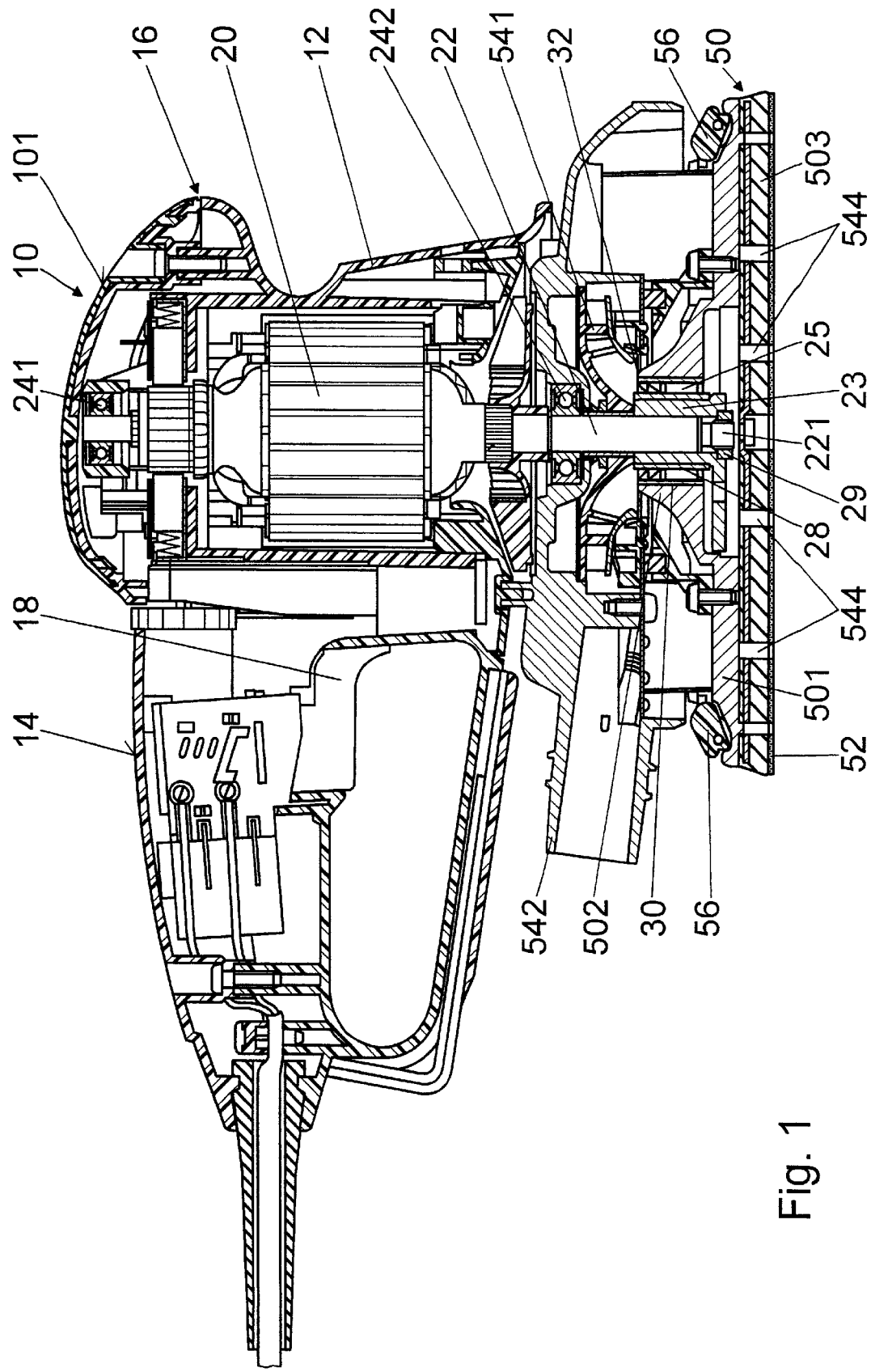

It is proposed that a bearing (425) closely adjacent to any incident grinding dust and/or chips created has, on at least one side of its bearing gap (26), a plurality of sealing disks (38, 40), in particular two of them, disposed side by side.

9 Claims, 6 Drawing Sheets

PORTABLE GRINDER WITH DOUBLE SEAL BEARING

PRIOR ART

The invention is based on a power tool, in particular a power sander, as generically defined by the preamble to claim 1.

In eccentric sanders and orbital sanders, it is known to use two—paired—ball bearings in line with one another to transmit a rotary motion or to generate an oscillating motion from a drive unit to a sanding plate.

This ball bearing, because of the structural design of such products, is always surrounded by abraded grinding material created during the work. This can happen because of air mixed with grinding material, or from turbulence in the region of the ball bearing.

Rotating masses create moments that twist an inner race and an outer race of the ball bearing counter to one another, so that a ball bearing seal between the inner race and the outer race lifts up and no longer performs its function. This creates a gap, which can allow grinding material to reach the interior of the ball bearing, and bearing lubricant can escape.

The invasion of grinding material and/or the escape of bearing lubricant between the ball bearing seal and the inner race or outer race of the ball bearing can lead to the destruction of the ball bearing and a failure of the eccentric sander or orbital sander. The resultant damage can be corrected only with what is usually an expensive repair.

Typically, to prevent tool failure, the intent is to prevent grinding material from being able to enter and mix with the bearing lubricant, which is accomplished by additionally using sealing disks, spin disks, and/or sealing rings.

ADVANTAGES OF THE INVENTION

The invention is based on a power tool, in particular a power sander with a housing and a motor, supported in the housing, that has a rotatable drive shaft which is connected operatively by one end to a tool, and in particular carries a sanding plate that can be equipped with grinding means, relative to which sanding plate the drive shaft is rotatably supported by means of a bearing, in particular by means of a roller bearing with an inner race and outer race spaced apart by a bearing gap and with rotationally fixed and rotatably disposed parts, and in particular is provided with means for removing grinding dust.

It is proposed that a bearing closely adjacent to any incident grinding dust and/or chips created has, on at least one side of its bearing gap, a plurality of sealing disks, in particular two of them, disposed side by side.

Instead of the single sealing disk that is usual at present, preferably at least two sealing disks per side are built into the bearing, preferably a roller bearing, with one sealing disk succeeding the other in the sealing gap. As a result of the sealing disks, a kind of labyrinth system can be achieved, and it can be reliably prevented that foreign substances will penetrate the bearing and/or that lubricants will escape. The positioning of the sealing disks can be done inside a component, in particular inside the outer race of a ball bearing. By means of the sealing disks, a sealing system can be achieved that is far more effective than a single sealing disk or than the combination of such a sealing disk with an additional seal. An undesired leakage gap from twisting of the outer race and inner race of the ball bearing relative to one another can be reliably prevented because of the attainable labyrinth effect. An advantageous labyrinth effect and a space-saving construction can be achieved in particular by means of closely adjacent sealing disks that preferably brace one another axially.

To minimize friction, toward the outside one grinding sealing disk and following it a contactless sealing disk can be used. With a contactless sealing disk in the axially inner region, it can also be achieved that lubricant that has penetrated between the sealing disks can flow back again. In principle, however, two or more grinding sealing disks or two or more contactless or non-grinding sealing disks each are also conceivable.

The proposed sealing system requires no further structural space outside the ball bearing, and an additional clamping of seals outside the bearing, and friction caused by an additional seal, can be avoided. By the use of the ball bearing with integrated sealing disks located one inside the other, only one component is required. Additional seals before and after the ball bearing can be avoided; the effort of assembly can be simplified; and additional errors from incorrect installation can be prevented. Furthermore, the sealing system is especially low in wear, since the sealing disks are encapsulated by the inner and outer races and are protected against external influences.

In order to achieve sealing disks that are advantageously as stiff as possible across the bearing gap, these sealing disks at least in part have a concave contour and/or have an inner metal part for reinforcement, preferably a zinc-coated sheet-metal part.

It is also proposed that the degree of filling of the bearing with lubricant is between 40% and 50%, and as a result a large reserve volume and a long service life can be attained.

DRAWING

Further advantages will become apparent from the ensuing description of the drawing. In the drawing, exemplary embodiments of the invention are shown. The drawing, description and claims include numerous characteristics in combination. One skilled in the art will expediently consider the characteristics individually as well and put them together to make useful further combinations.

Figure 2:
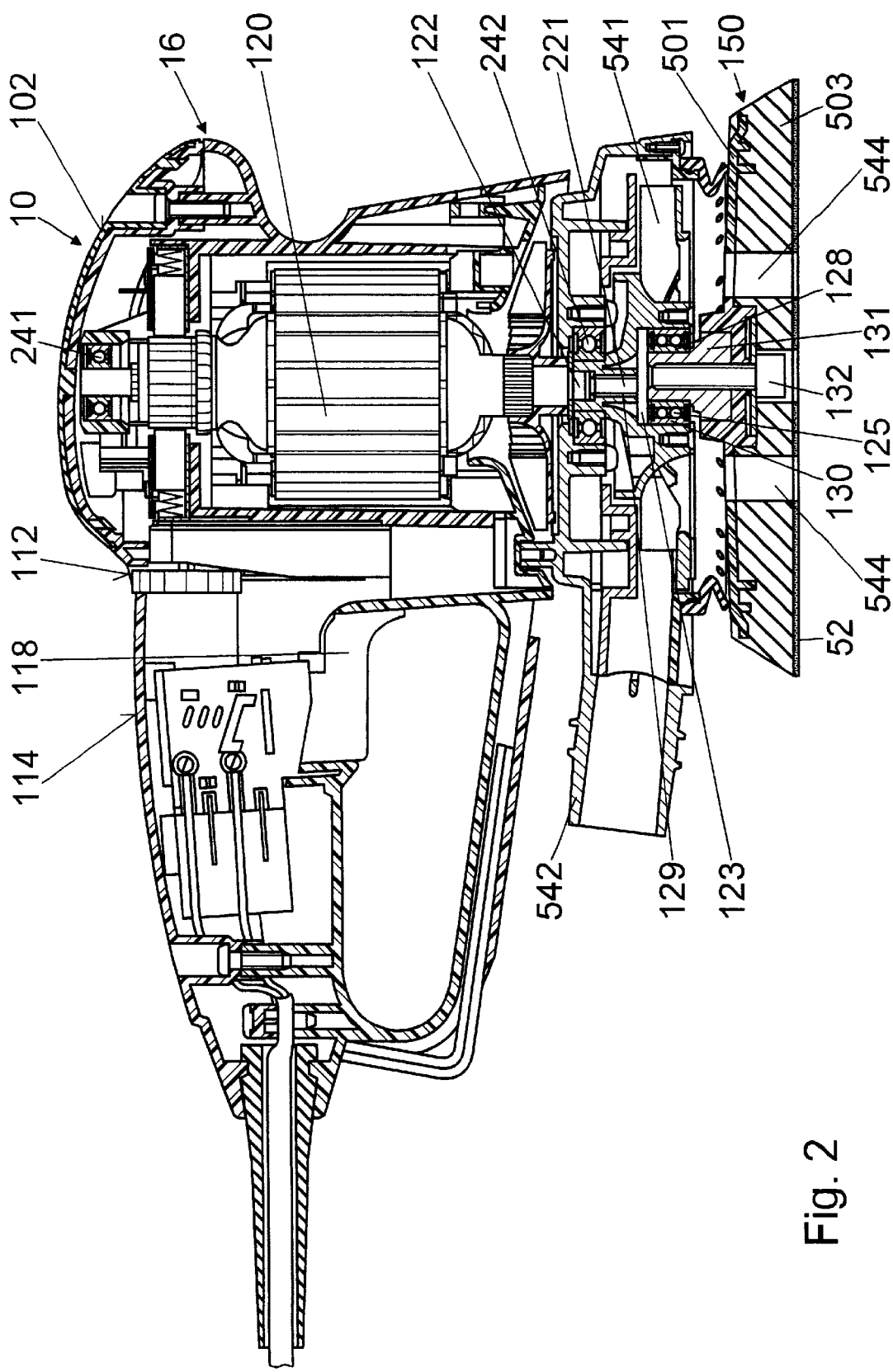
Figure 3:
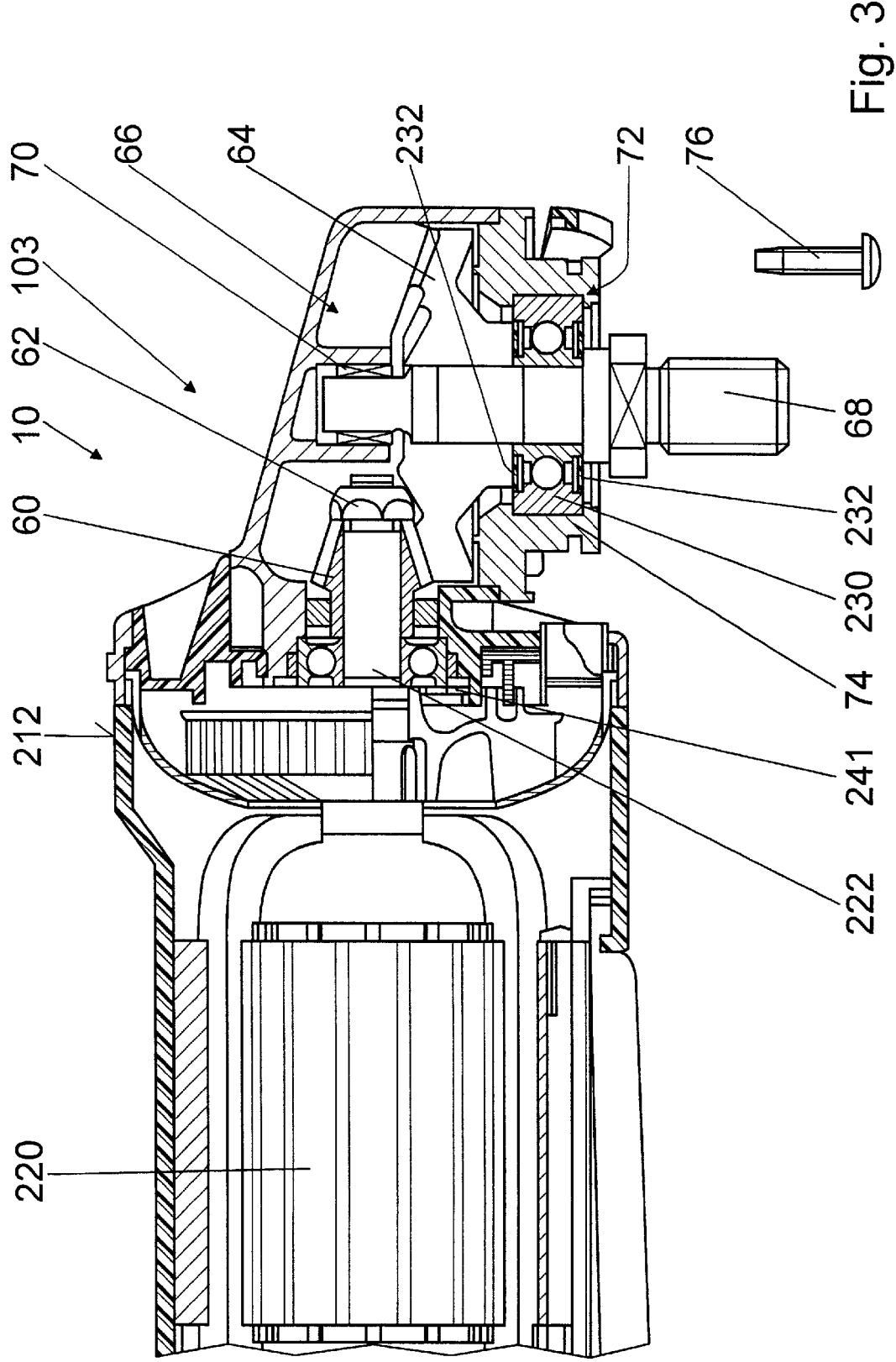
Figure 4:
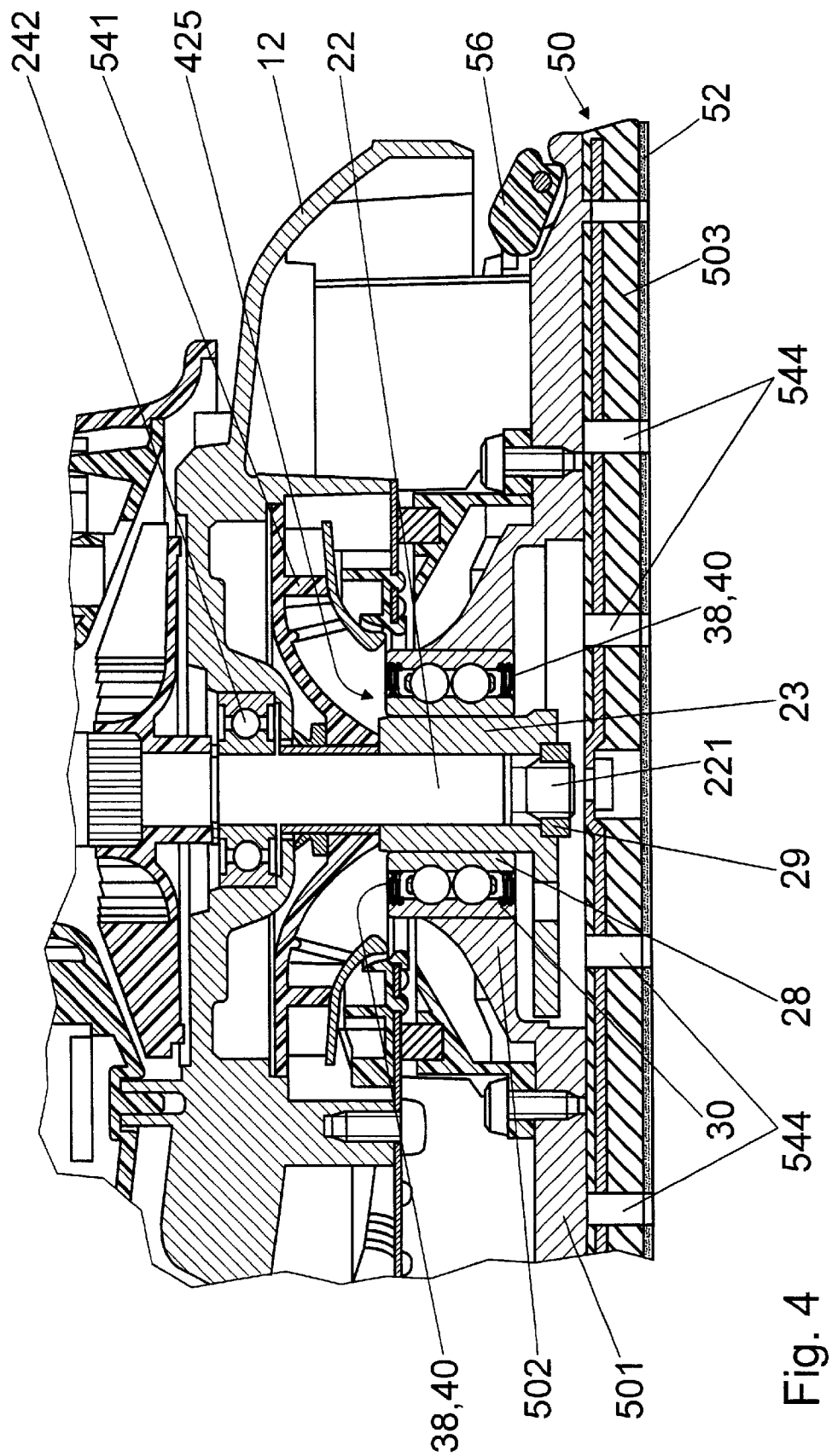
Figure 5:
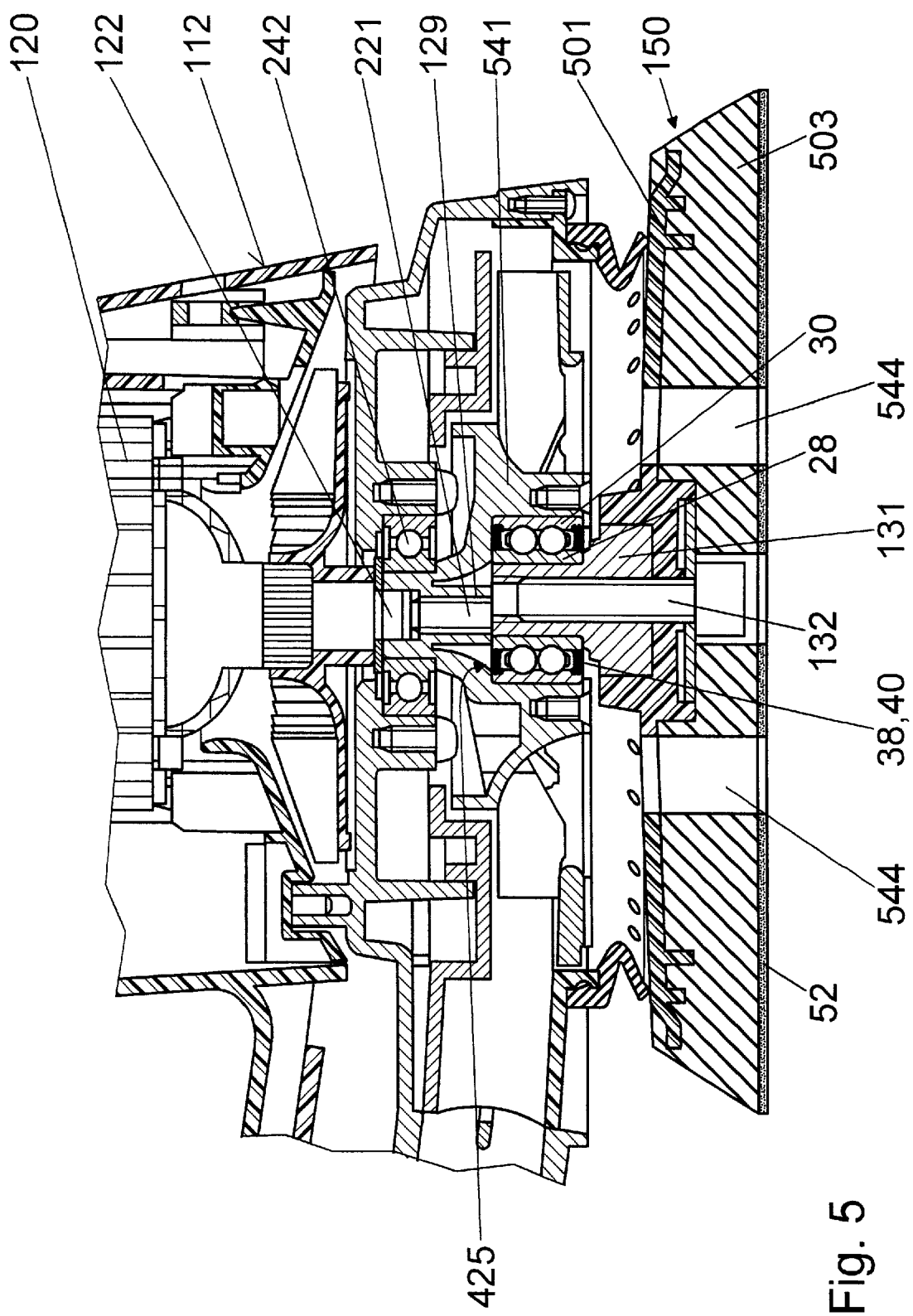
Figure 6:
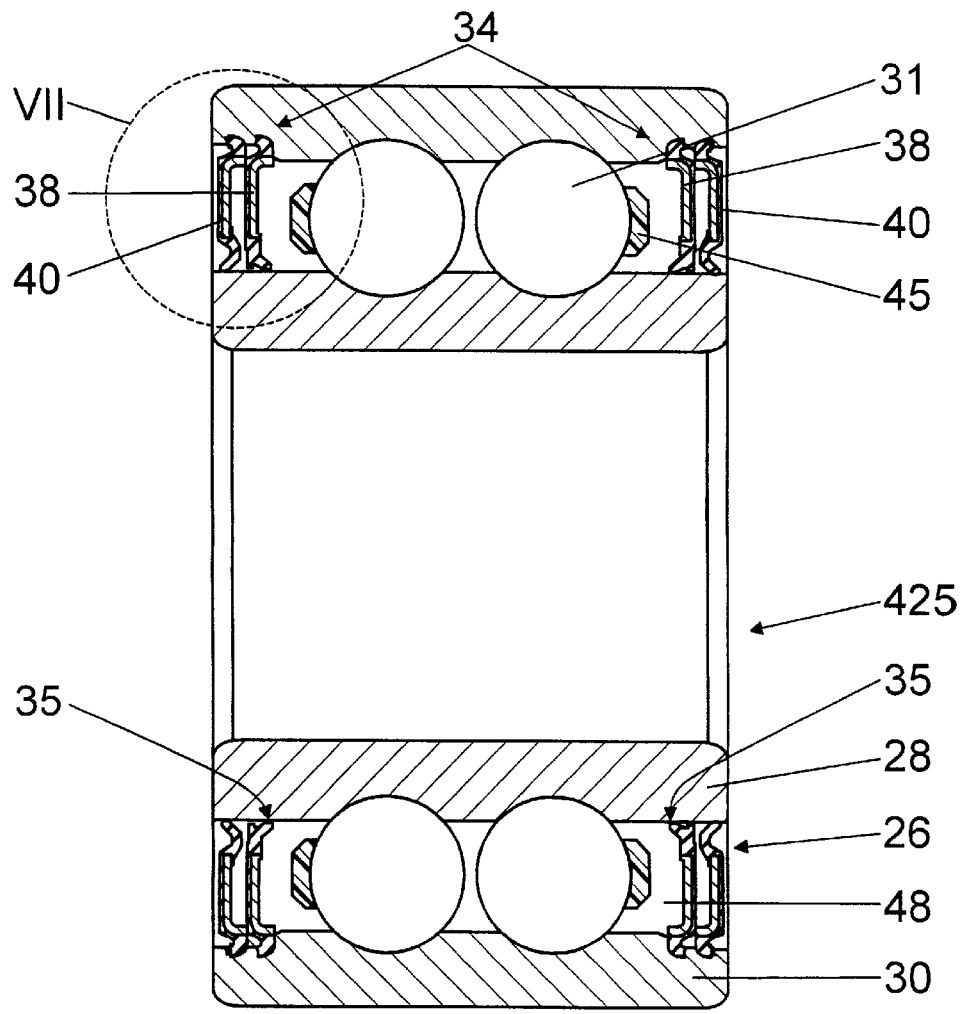
Figure 7:
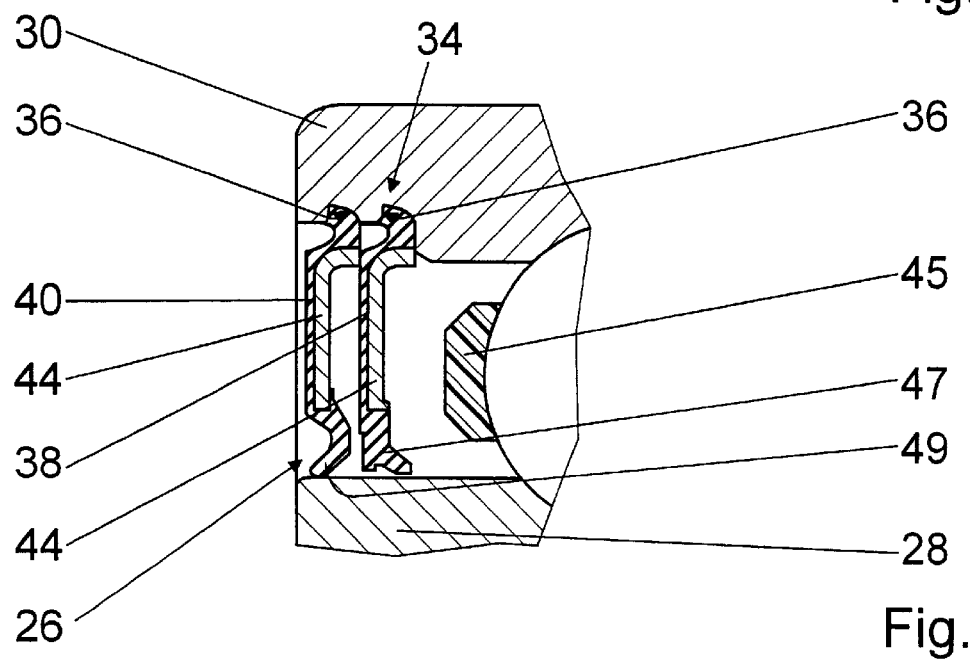

Shown are:

FIG. 1, an orbital sander in longitudinal section;

FIG. 2, an eccentric sander in longitudinal section;

FIG. 3, a detail of a right angle grinder in longitudinal section;

FIG. 4, a detail of an orbital sander of FIG. 1, with a multiply sealed-off eccentric bearing on both outer sides;

FIG. 5, a detail of an eccentric sander of FIG. 2, with a multiply sealed-off eccentric bearing on both outer sides as in FIG. 4;

FIG. 6, an eccentric bearing designed as a two-row angular ball bearing; and FIG. 7, an enlarged detail 7 of FIG. 6.

DESCRIPTION OF THE EXEMPLARY EMBODIMENTS

FIG. 1 shows a power tool 10, which is designed as a conventional orbital sander 101 and has a housing 12 with a hand grip 14 and an auxiliary hand grip 16. The hand grip 14 has a toggle switch 18, which turns the current supply to a motor 20 on and off. The motor 20 has a drive shaft 22, which is rotatably supported on its upper and lower end in a respective bearing 241, 242.

On its lower free end, the drive shaft 22 furthermore has a threaded portion 221, on which an eccentric sleeve 23 is held in a manner fixed against relative rotation by means of a nut 29. The eccentric sleeve 23 is embraced on the outside by the inner race 28 of an eccentric bearing 25, which is seated with its outer race 30 in a manner fixed against relative rotation in the bearing eye 502 of a sanding pad holder 501. The sanding pad holder carries a sanding pad 503 and with it forms a sanding plate 50.

The sanding plate 50 has continuous suction holes 544, through which—on passing through the congruent suction holes of a sanding sheet 52 fastened to the sole plate of the sanding plate 50—grinding dust created during grinding is aspirated or blown out by means of a ventilator 541, which rotates jointly with the drive shaft 22, by way of an extraction conduit to the extractor muff 542 and from there reaches a dust collection container, not shown.

The sanding sheet 52 is firmly retained on the sanding plate 50 by means of a chucking cam 56.

Upon rotation of the drive shaft 22, after actuation of the toggle switch 18, an orbiting motion without independent rotation is imparted to the sanding plate 50; that is, because the drive shaft 22 is capable of rotating freely relative to the sanding plate 50, only the eccentric motion is imparted to the sanding plate via the eccentric sleeve 23.

Because grinding dust flowing through is so nearby, the conventional eccentric bearing 25 is protected on its side toward the ventilator 541 against the entry of dust and dirt from the outside by separate sealing means 32 on the order of shaft seals. This protection is in need of improvement.

FIG. 2 shows a conventional eccentric sander 102 with a housing 112 and a hand grip 114 and an auxiliary hand grip 16. Components that remain essentially the same are identified throughout by the same reference numerals. The hand grip 114 has a toggle switch 118, which turns the current supply to a motor 120 on and off. The motor 120 has a drive shaft 122, which is rotatably supported on its upper and lower end, each in a respective bearing 241, 242.

Furthermore, on its lower, free end, the drive shaft 122 has a threaded portion 221, with which, on the upper face end of a ventilator 541, it engages the female-threaded portion 129 of the ventilator and receives this portion in a manner fixed against relative rotation.

The ventilator 541, on its underside, has an eccentric bore 123, in which the outer race 130 of a conventional eccentric bearing 125, designed as a two-row angular ball bearing, is seated in a manner fixed against relative rotation. With its inner race 128, the eccentric bearing embraces an eccentric peg 131, which as a result is rotatably supported relative to the fan 541. By means of a screw bolt 132, a round sanding plate 150 is fastened in a manner fixed against relative rotation to the free end of the eccentric peg 131.

The sanding plate 150 has a plurality of continuous suction holes 544, through which—after passing through the congruent suction holes of a sanding sheet 52 secured to the sole plate of the sanding plate 150—grinding dust, conveyed by the ventilator 541 that rotates jointly with the drive shaft 22, is aspirated or blown via an extraction conduit to the extractor muff 542 and from there reaches a dust collection container, not shown.

The sanding sheet 52 is firmly held on the sanding plate 50 by means of a Velcro™ closure.

Upon rotation of the drive shaft 22 after actuation of the toggle switch 18, an orbiting motion with simultaneous or superimposed independent rotation is imparted to the sanding plate 50.

On its side toward the ventilator 541, to prevent contact with grinding dust, the conventional eccentric bearing 125 is protected against the entry of dust and dirt by separate sealing means, on the order of shaft seals, not shown in detail. This protection is in need of improvement.

FIG. 3 shows a power tool 10 which is designed as a conventional right angle grinder 103 and has an elongated housing 212 that acts as a hand grip. It has a toggle switch, not shown, which turns the supply of current to a motor 220 on and off. The motor 220 has a motor shaft 222, which is rotatably supported on both ends, each in a respective bearing, of which only the front bearing 241 is shown.

The motor shaft 222, on its front end, has a small cone pinion 60, which is secured with a nut 62 and meshes with a plate wheel 64 and thus forms an angular gear 66. The plate wheel in a manner fixed against relative rotation embraces a work spindle 68, which is supported at the top in a needle bearing 72 and at the bottom in a flange bearing 72. The flange bearing is seated with its outer race 230 in a manner fixed against relative rotation in a bearing flange 74, which can be secured with screws 76 to the housing 212.

A grinding disk can be secured to the free end of the work spindle 68.

After actuation of the toggle switch, the work spindle 68 rotates, and with a grinding disk fastened to it, grinding work can be done, which typically produces a considerable amount of dust.

To avoid contact with grinding dust, the conventional flange bearing 72 is protected on the outside, on both of its outer sides, against the entry of dust and dirt by separate, caplike sealing means 232. Given the stringent demands made in professional use at construction sites, this protection is in need of improvement. In a right angle grinder, not shown, the flange bearing is therefore provided on both sides with a dual assembly of sealing disks, as shown in FIGS. 6 and 7.

FIG. 4 shows a detail of the orbital sander of FIG. 1, with the details described above which will not be repeated here; instead of a conventional eccentric bearing, however, an eccentric bearing 425 that is multiply sealed off on both outer sides is provided. As a result, the separate sealing means on the order of shaft seals of FIG. 1 can be dispensed with. The eccentric bearing 425 is protected considerably more securely against the invasion of dust and the escape of lubricant than the previously used bearing of FIG. 1, and installation is simpler because no separate sealing means have to be installed. Furthermore, there is no longer a need to procure the separate sealing means and keep them in stock.

Instead, the outer race 30, seated in a manner fixed against relative rotation in the bearing eye 502 of the sanding pad holder 501, has two parallel inner race grooves 36 on each outer side (FIGS. 6 and 7). One non-grinding sealing disk and one grinding sealing disk 38, 40, respectively, are each retained by the outer edge 34 in sealed fashion in the respective grooves. The inner edge 35 of each sealing disk 38, 40, with its foot region 47, 49, embraces the inner race 28 of the eccentric bearing 425 either in a grinding manner or at a slight gap spacing and forms a labyrinth seal, or the sealing disks 38, 40 form a labyrinth system.

The sealing disks 38, 40 comprise an inner metal part 44, which is spray-coated with plastic (FIGS. 6 and 7).

FIG. 5 shows a detail of the eccentric sander of FIG. 2 with the details recited above, which will not be repeated; instead of a conventional eccentric bearing, an eccentric bearing 425—as in FIG. 4—that is multiply sealed off is provided on both outer sides. As a result, the previous sealing means of FIG. 2 can be dispensed with.

The eccentric bearing 425 is protected considerably more securely against the entry of dust and the escape of lubricant than the previously used bearing of FIG. 2, and installation is simpler because no separate sealing means have to be installed. Furthermore, it is no longer necessary to procure the separate sealing means and keep them in stock.

Instead, the outer race 30 seated in a manner fixed against relative rotation in the ventilator 541, on each other side, has two parallel inner race grooves 36 (FIGS. 6 and 7). In each of the grooves, one nongrinding sealing disk and one grinding sealing disk 38, 40 each is retained, by the outer edge 34, in sealed fashion. The inner edge 35 of each sealing disk 38, 40, with its foot region 47, 49, embraces the inner race 28 of the eccentric bearing 425 in liplike fashion, either in a grinding manner or at a slight gap spacing and forms a labyrinth seal. The sealing disks 38, 40 comprising inner metal part 44, in particular zinc-coated steel, which is spray-coated with plastic.

FIG. 6, in an enlarged view, shows the eccentric bearing 425, designed as a two-row angular ball bearing, each with two sealing disks 38, 40, which seal off the bearing gap 26 on both sides, in a grinding manner on the outside and a nongrinding manner on the inside.

The inner race 28 and outer race 30 are each wider than in conventional angular ball bearings, and as a result they can effectively support twice the arrangement of sealing rings. The two rows of balls 31 are enclosed or guided by a bearing cage 45.

The sealing disks 38, 40, toward the balls 31, form a platelike hollow profile, and opposite the inner race 28 with their foot regions 47, 49 they form a grinding seal and a narrow-gapped labyrinth seal, respectively.

The eccentric bearing 425 is filled with lubricant 48 to a filling degree of 35% to 50%, compared to the filling degree of conventional bearings, which is 35%, plus or minus a 5% tolerance.

FIG. 7 illustrates the design of the outer race 30 of the bearing 425 with two closely adjacent inner race grooves 36, which are disposed in such a way that the sealing disks 38, 40 rest axially on one another.

The design of the foot regions 47, 49 of the sealing disks 38, 40 is also clearly visible.

In addition to the exemplary embodiments described, the embodiment according to the invention can also be employed in other power tools that appear appropriate to one skilled in the art.

List of Reference Numerals

10 Power tool
12 Housing
14 Hand grip
16 Auxiliary hand grip
18 Toggle switch
20 Motor
22 Drive shaft
23 Eccentric sleeve
25 Eccentric bearing
26 Bearing gap of 25, 125, 425
28 Inner race of 25, 125, 425
29 Nut
30 Outer race of 25, 125, 425
31 Balls
32 Sealing means
34 Outer edge
35 Inner edge
36 Two parallel radial grooves
38 Non-grinding sealing disk
40 Grinding sealing disk
44 Inner metal part
45 Bearing cage
47 Foot region
48 Lubricant
49 Foot region
50 Tool, sanding plate
52 Abrasive
56 Chucking cam
60 Cone pinion
62 Nut
64 Plate wheel
66 Angular gear
68 Work spindle
70 Needle bearing
72 Flange bearing
74 Bearing flange
76 Screw
101 Orbital sander
102 Eccentric sander
103 Right angle grinder
112 Housing
114 Hand grip
118 Toggle switch
120 Motor
122 Drive shaft
123 Eccentric bore
125 Eccentric bearing
128 Inner race
129 Female-threaded portion
130 Outer race
131 Eccentric peg
132 Screw bolt
150 Sanding plate
212 Housing
220 Motor
221 Threaded portion
222 Drive shaft
230 Outer race
232 Sealing means
241 Bearing
242 Bearing
425 Eccentric bearing
501 Sanding pad holder
502 Bearing eye
503 Sanding pad
541 Ventilator
542 Extractor muff
544 Suction hole

What is claimed is:

1. A power tool (10) with a housing (12, 112, 212) and a motor (20, 120, 220), supported in the housing, that has a rotatable drive shaft (22, 122, 222) which is connected operatively by one end to a tool (50, 150), wherein said drive shaft carries a sanding plate that can be equipped with grinding means (52), relative to which sanding plate the drive shaft (22, 122, 222) is rotatably supported by means of a roller bearing with an inner race (28) and outer race (30) spaced apart by a bearing gap (26) and with rotationally fixed and rotatably disposed parts, and is provided with means for removing grinding dust, characterized in that a bearing (425) closely adjacent to any incident grinding dust or chips created has, on at least one side of its bearing gap (26), two sealing disks (38, 40) disposed side by side, wherein one of D, the two sealing disks (38, 40) disposed on one side is a non-grinding sealing disk relative to the inner race (28) of the bearing (425), and the other is a grinding sealing disk, wherein said grinding sealing disk (40) is disposed on the outside of the bearing (425), and the non-grinding sealing disk (38) is disposed on the inside of it, oriented toward the roller bodies.

2. The power tool (10) of claim 1, wherein the two sealing disks (38, 40) are disposed adjacent one another as close together as possible, whereby said disks are bracing one another axially.

3. The power tool (10) of claim 1, wherein the sealing disks (38, 40) are disposed in a manner fixed against relative rotation by their outer edge (34), on the bearing (425) on its outer race (30) that is disposed structurally connected to the housing and being capable of snapping into two parallel inner race grooves in said outer race (36).

4. The power tool (10) of claim 1, wherein the bearing (425) next to the tool (50, 150) is a roller bearing, which on both sides of a bearing gap (26) has two sealing disks (38, 40) disposed side by side.

5. The power tool (10) of claim 1, wherein the bearing (425) is a two-row angular ball bearing.

6. The power tool (10) of claim 1, wherein the two sealing disks (38, 40) rest axially with their outer edge (34), in their mounted position, on the two parallel outer race grooves (36), and their remaining axial spacing from one another is dictated by a concave profile of said disks toward the balls (31).

7. A power tool (10) with a housing (12, 112, 212) and a motor (20, 120, 220), supported in the housing, that has a rotatable drive shaft (22, 122, 222) which is connected operatively by one end to a tool (50, 150), wherein said drive shaft carries a sanding plate that can be equipped with grinding means (52), relative to which sanding plate the drive shaft (22, 122, 222) is rotatably supported by means of a roller bearing with an inner race (28) and outer race (30) spaced apart by a bearing gap (26) and with rotationally fixed and rotatably disposed parts, and is provided with means for removing grinding dust, characterized in that a bearing (425) closely adjacent to any incident grinding dust or chips created has, on at least one side of its bearing gap (26), two sealing disks (38, 40) disposed side by side, wherein the sealing disks (38, 40) comprise plastic, said plastic selected from the group consisting of RSR, RSL, RST, RSF, and Viton, and wherein said sealing disks (38, 40) include a metal part (44), said metal part (44) comprising zinc-coated steel.

8. A power tool (10) with a housing (12, 112, 212) and a motor (20, 120, 220), supported in the housing, that has a rotatable drive shaft (22, 122, 222) which is connected operatively by one end to a tool (50 150), wherein said drive shaft carries a sanding plate that can be equipped with grinding means (52), relative to which sanding plate the drive shaft (22, 122, 222) is rotatably supported by means of a roller bearing with an inner race (28) and outer race (30) spaced apart by a bearing gap (26) and with rotationally fixed and rotatably disposed parts, and is provided with means for removing grinding dust, characterized in that a bearing (425) closely adjacent to any incident grinding dust or chips created has, on at least one side of its bearing gap (26), two sealing disks (38, 40) disposed side by side, wherein the inner race (28) and the outer race (30) are each approximately 4 mm wider than the inner race and outer race, respectively, of a deep groove ball bearing without sealing disks (38, 40).

9. A power tool (10) with a housing (12, 112, 212) and a motor (20, 120, 220), supported in the housing, that has a rotatable drive shaft (22, 122, 222) which is connected operatively by one end to a tool (50, 150), wherein said drive shaft carries a sanding plate that can be equipped with grinding means (52), relative to which sanding plate the drive shaft (22, 122, 222) is rotatably supported by means of a roller bearing with an inner race (28) and outer race (30) spaced apart by a bearing gap (26) and with rotationally fixed and rotatably disposed parts, and is provided with means for removing grinding dust, characterized in that a bearing (425) closely adjacent to any incident grinding dust or chips created has, on at least one side of its bearing gap (26), two sealing disks (38, 40) disposed side by side, wherein a degree of filling of the bearing (415) with lubricant is between 40% and 50%.

\* \* \* \* \*